US010564899B2

(12) United States Patent
Yen

(10) Patent No.: US 10,564,899 B2
(45) Date of Patent: Feb. 18, 2020

(54) DATA WRITING METHOD FOR REWRITABLE NON-VOLATILE MEMORY MODULES BASED ON USE INFORMATION, MEMORY STORAGE DEVICE AND MEMORY CONTROL CIRCUIT UNIT

(71) Applicant: PHISON ELECTRONICS CORP., Miaoli (TW)

(72) Inventor: Chia-Han Yen, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 75 days.

(21) Appl. No.: 15/588,712

(22) Filed: May 8, 2017

(65) Prior Publication Data

US 2018/0267736 A1 Sep. 20, 2018

(30) Foreign Application Priority Data

Mar. 16, 2017 (TW) .............................. 106108793 A

(51) Int. Cl.
*G06F 3/06* (2006.01)
*G06F 12/02* (2006.01)

(52) U.S. Cl.
CPC ............ *G06F 3/0679* (2013.01); *G06F 3/064* (2013.01); *G06F 3/0611* (2013.01); *G06F 3/0652* (2013.01); *G06F 12/0246* (2013.01)

(58) Field of Classification Search
CPC .... G06F 3/0647; G06F 3/0679; G06F 3/0611; G06F 3/0652; G06F 12/0246
USPC .................................................. 711/103, 115
See application file for complete search history.

(56) References Cited

U.S. PATENT DOCUMENTS

| 2008/0098159 | A1* | 4/2008 | Song | G06F 12/0246 |
| | | | | 711/103 |
| 2009/0125671 | A1* | 5/2009 | Flynn | G06F 9/52 |
| | | | | 711/103 |
| 2012/0278535 | A1* | 11/2012 | Yeh | G06F 12/0246 |
| | | | | 711/103 |
| 2014/0040534 | A1* | 2/2014 | Low | G06F 12/00 |
| | | | | 711/103 |
| 2014/0189207 | A1* | 7/2014 | Sinclair | G06F 12/0246 |
| | | | | 711/103 |
| 2015/0193340 | A1* | 7/2015 | Liang | G06F 12/0246 |
| | | | | 711/103 |
| 2016/0328179 | A1* | 11/2016 | Quinn | G06F 3/0611 |
| 2017/0075812 | A1* | 3/2017 | Wu | G06F 12/0893 |

(Continued)

*Primary Examiner* — Tasnima Matin
(74) *Attorney, Agent, or Firm* — JCIPRNET

(57) ABSTRACT

A data writing method, a memory storage device and a memory control circuit unit are provided. The data writing method includes: writing first data belonging to a first logical sub-unit of a first logical unit and second data belonging to a second logical sub-unit of the first logical unit to a first physical erasing unit and a second physical erasing unit respectively; recording use information corresponding to each logical unit; and executing a data arrangement operation corresponding to the first logical unit based on the use information of the first logical unit to copy the first data and the second data from the first physical erasing unit and the second physical erasing unit to a third physical erasing unit, wherein a logical address range of the second logical sub-unit follows a logical address range of the first logical sub-unit.

27 Claims, 11 Drawing Sheets

(56) References Cited

U.S. PATENT DOCUMENTS

| | | | |
|---|---|---|---|
| 2017/0123713 A1* | 5/2017 | Fisher | G06F 3/064 |
| 2017/0262197 A1* | 9/2017 | Tan | G06F 3/0619 |

* cited by examiner

DATA WRITING METHOD FOR REWRITABLE NON-VOLATILE MEMORY MODULES BASED ON USE INFORMATION, MEMORY STORAGE DEVICE AND MEMORY CONTROL CIRCUIT UNIT

CROSS-REFERENCE TO RELATED APPLICATION

This application claims the priority benefit of Taiwan application serial no. 106108793, filed on Mar. 16, 2017. The entirety of the above-mentioned patent application is hereby incorporated by reference herein and made a part of this specification.

BACKGROUND

Technical Field

The present invention relates to a data writing method, and more particularly, relates to a data writing method for a rewritable non-volatile memory module, and a memory storage device and a memory control circuit unit using the same.

Description of Related Art

The growth of digital cameras, mobile phones, and MP3 players has been rapid in recent years. Consequently, the consumers' demand for storage media has increased tremendously. A rewritable non-volatile memory module is highly adaptable to be disposed in portable electronic products as the storage medium for the portable electronic products due to its data non-volatility, low power consumption, small volume, non-mechanical structure and high read/write speed.

When the host system intends to store data into the rewritable non-volatile memory module, a controller of the rewritable non-volatile memory module retrieves one physical unit for storing the data that the host system intends to store. The controller can sequentially store the to-be-stored data into physical programming units of the retrieved physical erasing unit, and records mapping information of the logical sub-units and the physical programming units corresponding to the data into a logical-physical mapping table. When the host system intends to read the data, the controller can find the mapped physical programming units from the logical-physical mapping table according to the logical sub-unit instructed by the host system for reading the data.

However, if write-data from the host system belongs to non-sequential data (e.g., the write-data belongs to non-sequential logical sub-units), the write-data stored in one physical erasing unit may also belong to non-sequential logical addresses. In other words, the logical sub-units in one logical unit may be mapped to the physical programming units from different physical erasing units. In that case, when the host system intends to read data belonging to multiple logical sub-units in one logical unit corresponding to sequential logical addresses, the controller may need to load in different logical-physical mapping tables for finding multiple physical programming units distributed across different physical erasing units. Later, because the controller needs to send multiple read commands in order to read the data from the distributed physical programming units, a read operation will take a considerably long time to execute.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The present invention is directed to a data writing method, a memory storage device and a memory control circuit unit, which are capable of reducing the execution time for the reading operation.

An exemplary embodiment of the present invention proposes a data writing method for a rewritable non-volatile memory module having a plurality of physical erasing units. The method includes configuring a plurality of logical units for mapping to at least a part of physical erasing units among the physical erasing units. The logical units include a first logical unit. The method also includes writing first data belonging to the first logical unit into a first physical erasing unit among the physical erasing units, and writing second data belonging to the first logical unit into a second physical erasing unit among the physical erasing units. The method also includes recording use information corresponding to each logical unit. Moreover, the method further includes executing a data move operation corresponding to the first logical unit based on the use information of the first logical unit to copy the first data and the second data belonging to the first logical unit from the first physical erasing unit and the second physical erasing unit to a third physical erasing unit among the physical erasing units. Further, the first data belongs to a first logical sub-unit of the first logical unit, the second data belongs to a second logical sub-unit of the first logical unit, and a logical address range of the second logical sub-unit follows a logical address range of the first logical sub-unit.

Another exemplary embodiment of the present invention proposes a memory storage device, which includes a connection interface unit, a rewritable non-volatile memory module and a memory control circuit unit. The connection interface unit is configured to couple to a host system. The rewritable non-volatile memory module includes a plurality of physical erasing units. The memory control circuit unit is configured to couple to the connection interface unit and the rewritable non-volatile memory module. The memory control circuit unit is configured to configure a plurality of logical units for mapping to at least a part of physical erasing units among the physical erasing units. The logical units include a first logical unit. The memory control circuit unit is further configured to write first data belonging to the first logical unit into a first physical erasing unit among the physical erasing units. The memory control circuit unit is further configured to write second data belonging to the first logical unit into a second physical erasing unit among the physical erasing units. The memory control circuit unit is further configured to record use information corresponding to each logical unit among the logical units. The memory control circuit unit is further configured to execute a data move operation corresponding to the first logical unit based on the use information of the first logical unit to copy the first data and the second data belonging to the first logical unit from the first physical erasing unit and the second physical erasing unit to a third physical erasing unit among the physical erasing units. Further, the first data belongs to a first logical sub-unit of the first logical unit, the second data belongs to a second logical sub-unit of the first logical unit, and a logical address range of the second logical sub-unit follows a logical address range of the first logical sub-unit.

Another exemplary embodiment of the present invention proposes a memory control circuit unit, which is configured to control a rewritable non-volatile memory module having a plurality of physical erasing units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to configure a plurality of logical units for mapping to at least a part of physical erasing units among the physical erasing units. The logical units include a first logical unit. The memory management circuit is further configured to write first data belonging to the first logical unit into a first physical erasing unit among the physical erasing units. The memory management circuit is further configured to write second data belonging to the first logical unit into a second physical erasing unit among the physical erasing units. The memory management circuit is further configured to record use information corresponding to each logical unit among the logical units. The memory management circuit is further configured to execute a data move operation corresponding to the first logical unit based on the use information of the first logical unit to copy the first data and the second data belonging to the first logical unit from the first physical erasing unit and the second physical erasing unit to a third physical erasing unit among the physical erasing units. Further, the first data belongs to a first logical sub-unit of the first logical unit, the second data belongs to a second logical sub-unit of the first logical unit, and a logical address range of the second logical sub-unit follows a logical address range of the first logical sub-unit.

Based on the above, the valid count and the access parameter of the logical unit can be obtained by recording the use information corresponding to the logical unit. When the valid count of the logical unit reaches the valid count threshold and the access parameter reaches the access parameter threshold, the data belonging to such logical unit will be arranged into one physical erasing unit. As a result, the execution time can be reduced for the reading operation.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1:
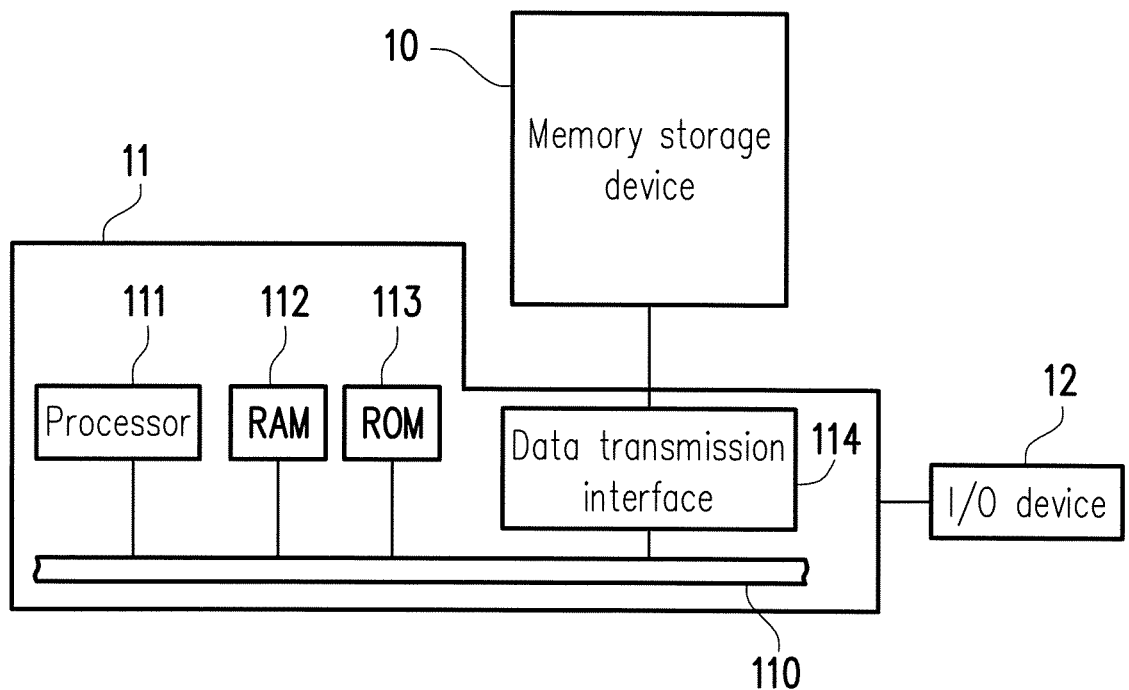
FIG. 1 is a schematic diagram illustrating a host system, a memory storage device and an input/output (I/O) device according to an exemplary embodiment.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (a.k.a. a memory storage system) includes a rewritable non-volatile memory module and a controller (a.k.a. a control circuit unit). The memory storage device is usually configured together with a host system so the host system can write data into the memory storage device or read data from the memory storage device.

Figure 2:
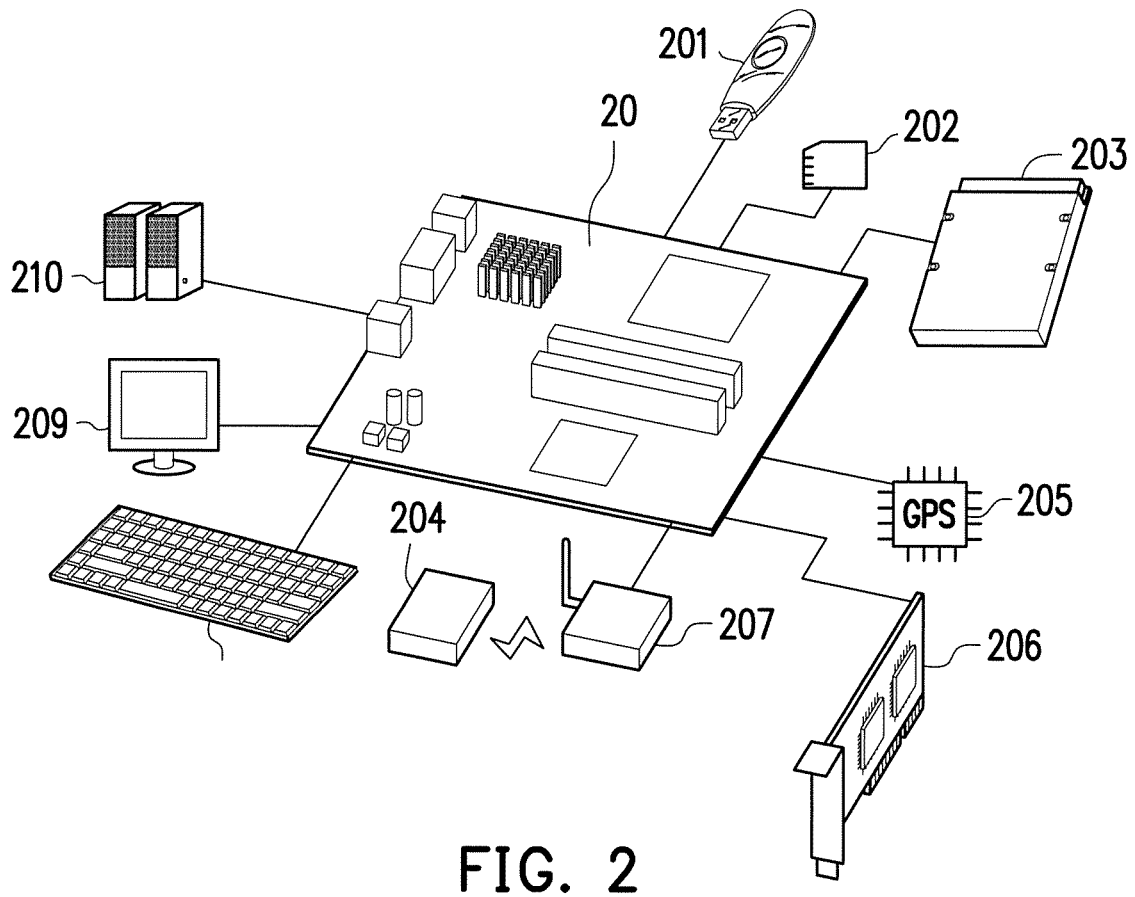
FIG. 2 is a schematic diagram illustrating a host system, a memory storage device and an input/output (I/O) device according to another exemplary embodiment.

FIG. 1 is a schematic diagram illustrating a host system, a memory storage device and an input/output (I/O) device according to an exemplary embodiment, and FIG. 2 is a schematic diagram illustrating a host system, a memory storage device and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can write data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication Storage) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
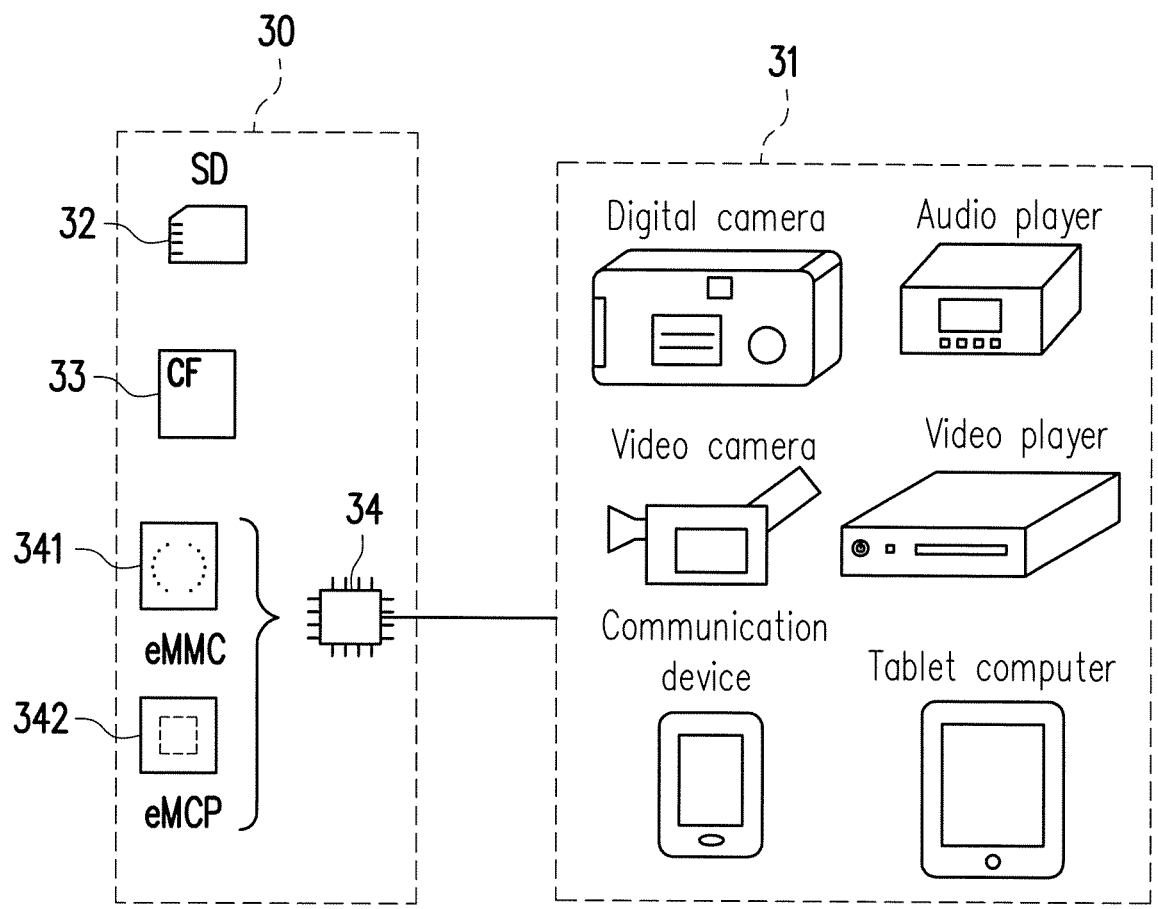
FIG. 3 is a schematic diagram illustrating a host system and a memory storage device according to another exemplary embodiment.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
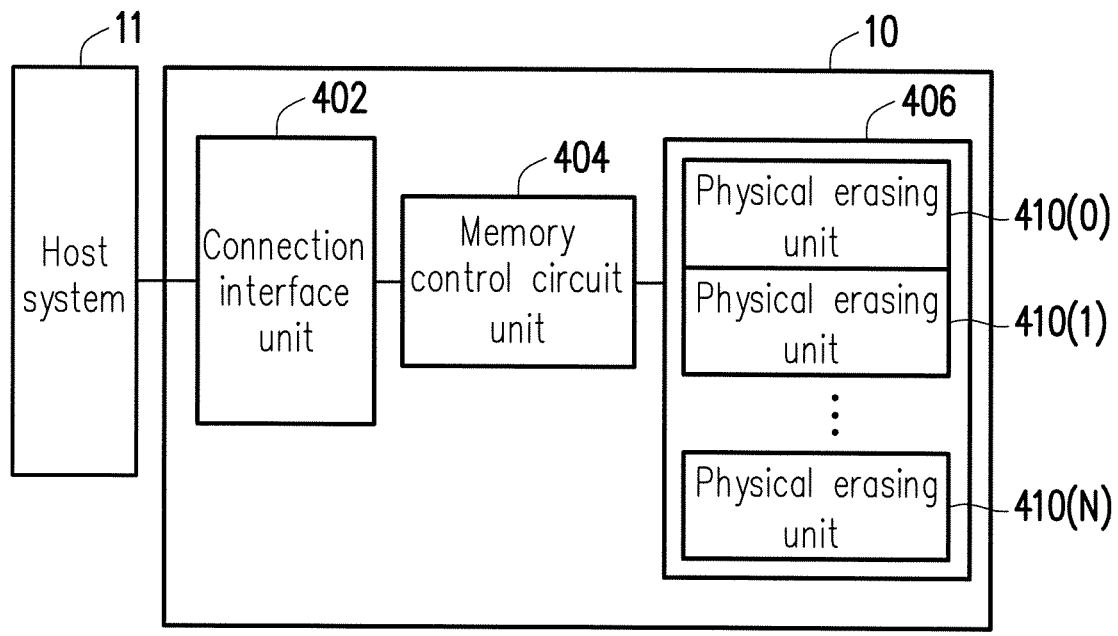
FIG. 4 is a schematic block diagram illustrating a host system and a memory storage device according to an exemplary embodiment.

FIG. 4 is a schematic block diagram illustrating a host system and a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a Secure Digital (SD) interface standard. Nevertheless, it should be understood that the invention is not limited thereto. The connection interface unit 402 may also be compatible to a SATA (Serial Advanced Technology Attachment) standard, a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In the present exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the disclosure is not limited thereto. Each physical erasing unit may be composed of 64 physical programming units, 256 physical programming units or any number of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundant bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also contain more or less physical access addresses, and the number and size of the physical access addresses are not limited by the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a SLC (Single Level Cell) NAND flash memory module (i.e., a flash memory module capable of storing one data bit in one memory cell). However, the invention is not limited thereto. The rewritable non-volatile memory module 406 may also be a MLC (Multi Level Cell) NAND flash memory module, (i.e., a flash memory module capable of storing two data bits in one memory cell), a TLC (Trinary Level Cell) NAND flash memory module (i.e., a flash memory module capable of storing three data bits in one memory cell), other flash memory modules or any memory module having the same features.

Figure 5:
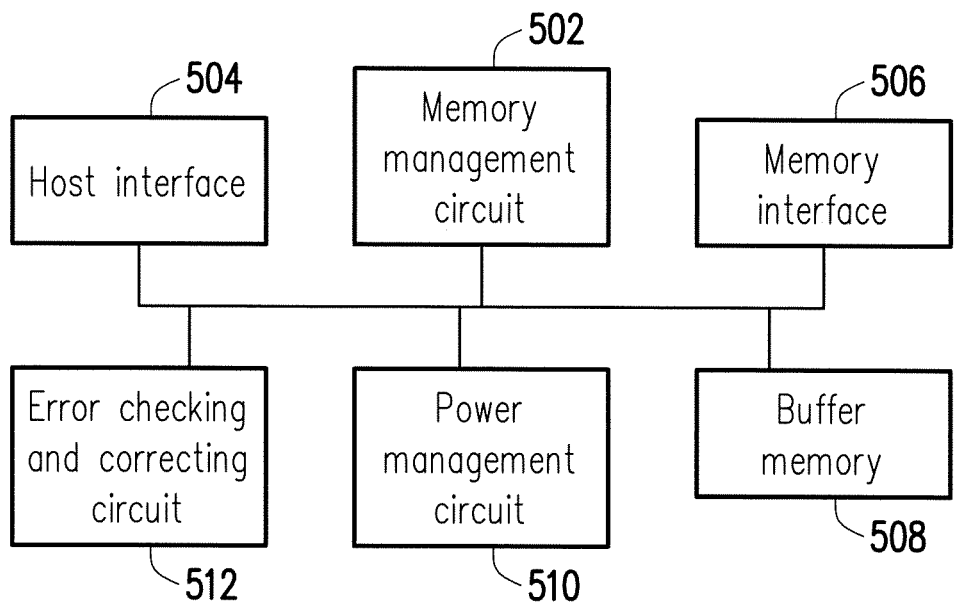
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands and the control commands are executed to execute various operations such as writing, reading and erasing data during operation of the memory storage device 10.

In the present exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. During operation of the memory storage device 10, the control commands are executed by the microprocessor to perform operations of writing, reading or erasing data.

In another exemplary embodiment of the invention, the control commands of the memory management circuit 502 may also be stored, in form of program codes, into a specific area (e.g., a system area in the memory module exclusively for storing the system data) of the rewritable non-volatile memory module 406. In addition, the memory management circuit 502 has a microprocessor unit (not illustrated), a ROM (not illustrated) and a RAM (not illustrated). Particularly, the ROM has an activate code, which is executed by the microprocessor unit to load the control commands stored in the rewritable non-volatile memory module 406 to the RAM of the memory management circuit 502 when the memory control circuit unit 404 is enabled. Thereafter, the control commands are executed by the microprocessor unit to perform operations of writing, reading or erasing data.

Further, in another exemplary embodiment of the invention, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to give a write command to the rewritable non-volatile memory module 406 in order to write data into the rewritable non-volatile memory module 406; the memory reading circuit is configured to give a read command to the rewritable non-volatile memory module 406 in order to read data from the rewritable non-volatile memory module 406; the memory erasing circuit is configured to give an erase command to the rewritable non-volatile memory module 406 in order to erase data from the rewritable non-volatile memory module 406; and The data processing circuit is configured to process both the data to be written into the rewritable non-volatile memory module 406 and the data read from the rewritable non-volatile memory module 406.

The host interface 504 is coupled to the memory management circuit 502 and configured to couple to the connection interface unit 402, so as to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the invention is not limited thereto. The host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506.

The buffer memory 508 is coupled to the memory management circuit 502 and configured to temporarily store data and commands from the host system 11 or data from the rewritable non-volatile memory module 406.

In an exemplary embodiment, the memory control circuit unit 404 further includes a buffer memory 508, a power management circuit 510 and an error checking and correcting circuit 512.

The power management unit 510 is coupled to the memory management circuit 502 and configured to control a power of the memory storage device 10.

The error checking and correcting circuit 512 is coupled to the memory management circuit 502 and configured to execute an error checking and correcting procedure to ensure the data integrity. Specifically, when the memory management circuit 502 receives a write command from the host system 11, the error checking and correcting circuit 512 generates an ECC code (Error Checking and Correcting Code) for the data corresponding to the write command, and the memory management circuit 502 writes the data and the ECC code corresponding to the write command into the rewritable non-volatile memory module 406. Later, when reading the data from the rewritable non-volatile memory module 406, the memory management circuit 502 also reads the error checking and correcting code corresponding to the data, and the error checking and correcting circuit 512 executes the error checking and correcting procedure for the read data according to the error checking and correcting code.

In the following description, the operations executed by the memory management circuit 502, the host interface 504, the memory interface 506, the buffer memory 508, the power management circuit 510 and the error checking and correcting circuit 512 may also be referred to as being executed by the memory control circuit unit 404.

Figure 6:
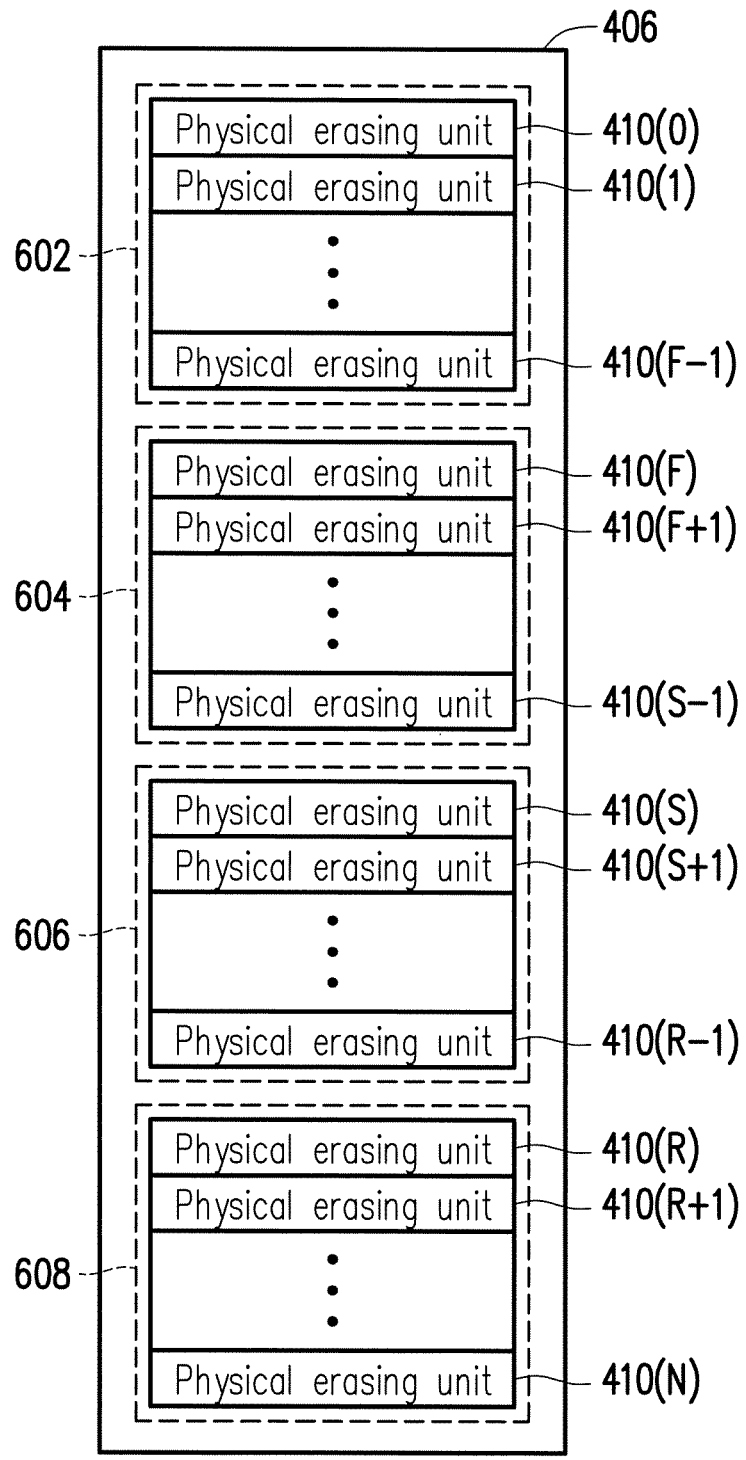
FIG. 6 and FIG. 7 are schematic diagrams illustrating a management of the physical erasing units according to an exemplary embodiment.
Figure 7:
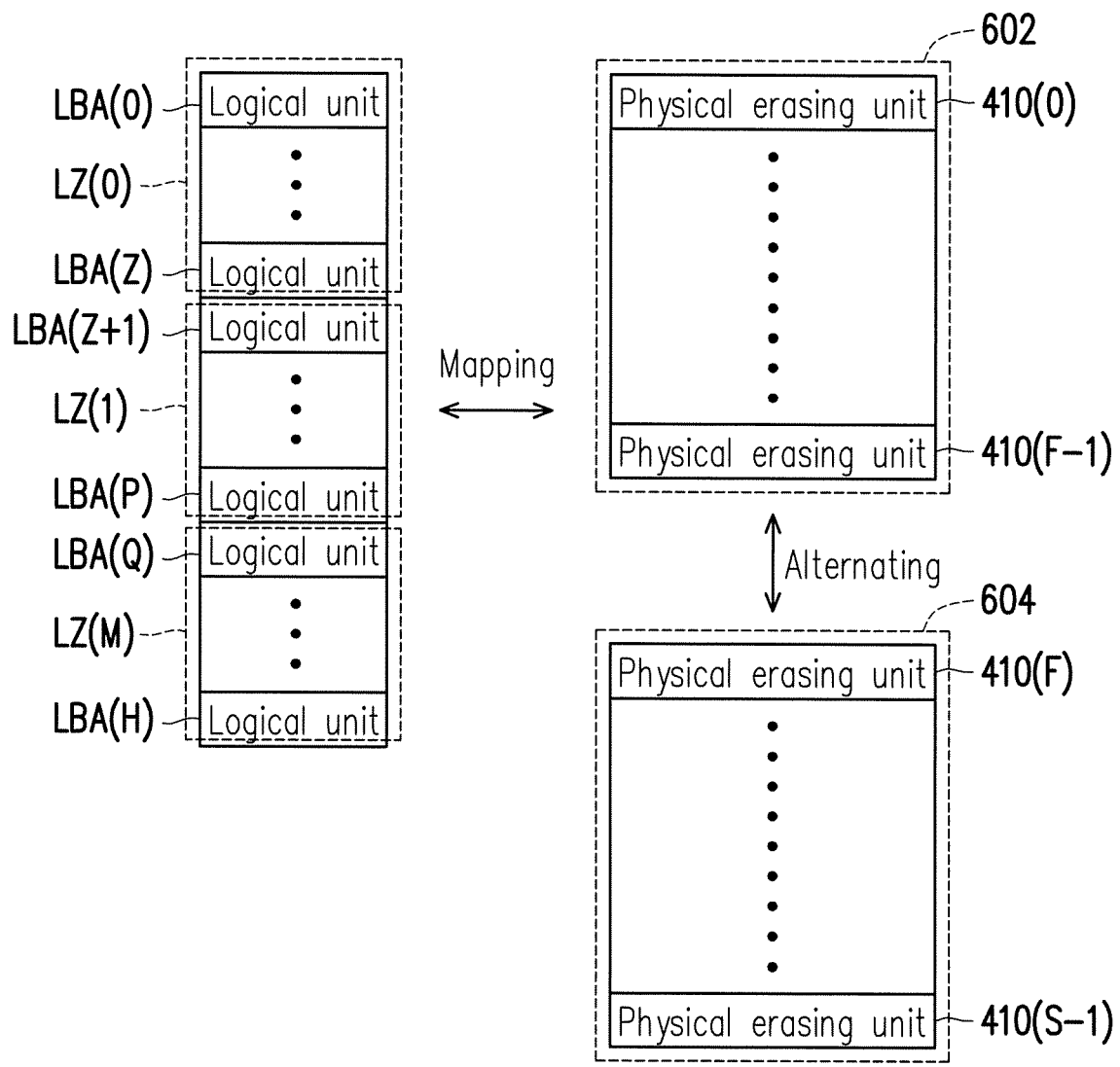

FIG. 6 and FIG. 7 are schematic diagrams illustrating a management of the physical erasing units according to an exemplary embodiment.

It should be understood that terms, such as "get", "retrieve", "group", "divide", "associate" and so forth, are logical concepts which describe operations in the physical erasing units of the rewritable non-volatiles memory module 406. In other words, the physical erasing units of the rewritable non-volatile memory module are logically operated so actual positions of the physical units of the rewritable non-volatile memory module are not changed.

Referring to FIG. 6, the memory management circuit 502 logically groups the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to alternate the physical erasing units of the data area 602. In other words, when the write command and the data to be written are received from the host system 11, the memory management circuit 502 selects the physical erasing units from the spare area 604, and writes the data into the selected physical erasing units as replacement to the physical erasing units in the data area 602.

The physical erasing units logically belonging to the system area 606 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 608 are used in a bad physical erasing unit replacement procedure for replacing damaged physical erasing units. More specifically, if the replacement area 608 still includes normal physical erasing units when the physical erasing units of the data area 602 are damaged, a memory management circuit 502 retrieves the normal physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operation of the memory storage device 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 7, the memory management circuit 502 configures logical units LBA(0) to LBA(H) for mapping to the physical erasing units in the data area 602, where each of the logical units includes a plurality of logical sub-units for mapping to the physical programming units of the corresponding physical erasing units. Further, when the host system 11 intends to write the data into the logical units or update the data stored in the logical units, the memory management circuit 502 can retrieve one physical erasing unit from the spare area 604 as replacement to the physical erasing units of the data area 602 for writing the data. In the present exemplary embodiment, the logical sub-units may be logical pages or logical sectors.

In order to identify the physical erasing units to which the data of each logical unit is being stored to, the memory management circuit 502 can record a mapping between the logical unit and the physical erasing unit in the present exemplary embodiment. Further, when the host system 11 intends to access the data in the logical sub-unit, the memory management circuit 502 can confirm the logical unit to which the logical sub-unit belongs and access the data in the physical erasing unit mapped to the logical unit. For instance, in the present exemplary embodiment, the memory management circuit 502 stores logical-physical mapping tables into the rewritable non-volatile memory module 406 for recording the physical erasing units mapped to the logical units, and the logical-physical mapping tables are loaded into the buffer memory 508 for maintenance when the memory management circuit 502 intends to the access the data.

It should be noted that, the mapping table cannot record the mapping relation for all of the logical units because a capacity of the buffer memory 508 is limited. Therefore, in the present exemplary embodiment, the memory management unit 502 can group the logical units LBA(0) to LBA(H) into a plurality of logical zones LZ(0) to LZ(M) and configure one logical-physical mapping table for each of the logical zones. In particular, when the memory management unit 502 intends to update the mapping relation for one specific logical unit, the logical-physical mapping table corresponding to the logical zone to which the logical unit belongs may be loaded into the buffer memory 508 for updating.

It should be noted that, in an exemplary embodiment, the management of the rewritable non-volatile memory module 406 of the memory storage device 10 is performed based on the physical programming units (also known as page based). For example, when the write command is executed, the memory management unit 502 writes the data in a manner of one physical programming unit after another physical programming unit (also known as a random writing mechanism) regardless of the logical sub units of which logical unit are to be written with the current data. Specifically, the memory management circuit 502 retrieves one empty physical erasing unit from the spare area 604 to serve as an in-use physical erasing unit for writing data. Further, once the in-use physical erasing unit is fully written, the memory management circuit 502 retrieves another empty physical erasing unit from the spare area 604 to serve as the in-use physical erasing unit to continue writing the data corresponding to the write command from the host system 11.

When the write command from the host system 11 instructs data to be written into multiple logical sub-units belonging to different logical units, the memory management circuit 502 sequentially writes the data belonging to the logical sub-units of the different logical unit into the physical programming units of the in-use physical erasing unit. In other words, after operating for a period of time, the data belonging to the sequential logical sub-units of the same logical unit may be written into different physical erasing units.

| Term | Abbreviation |
| --- | --- |
| Logical address-physical address mapping table | L2P table |
| physical address-Logical address mapping table | P2L table |
| rewritable non-volatile memory module | RNVM module |
| physical erasing unit | PEU |
| physical programming unit | PPU |
| Logical erasing unit | LEU |
| Logical programming unit | LPU |
| logical sub-unit | LSU |
| logical unit | LU |
| memory management circuit | MMC |

Figure 8:
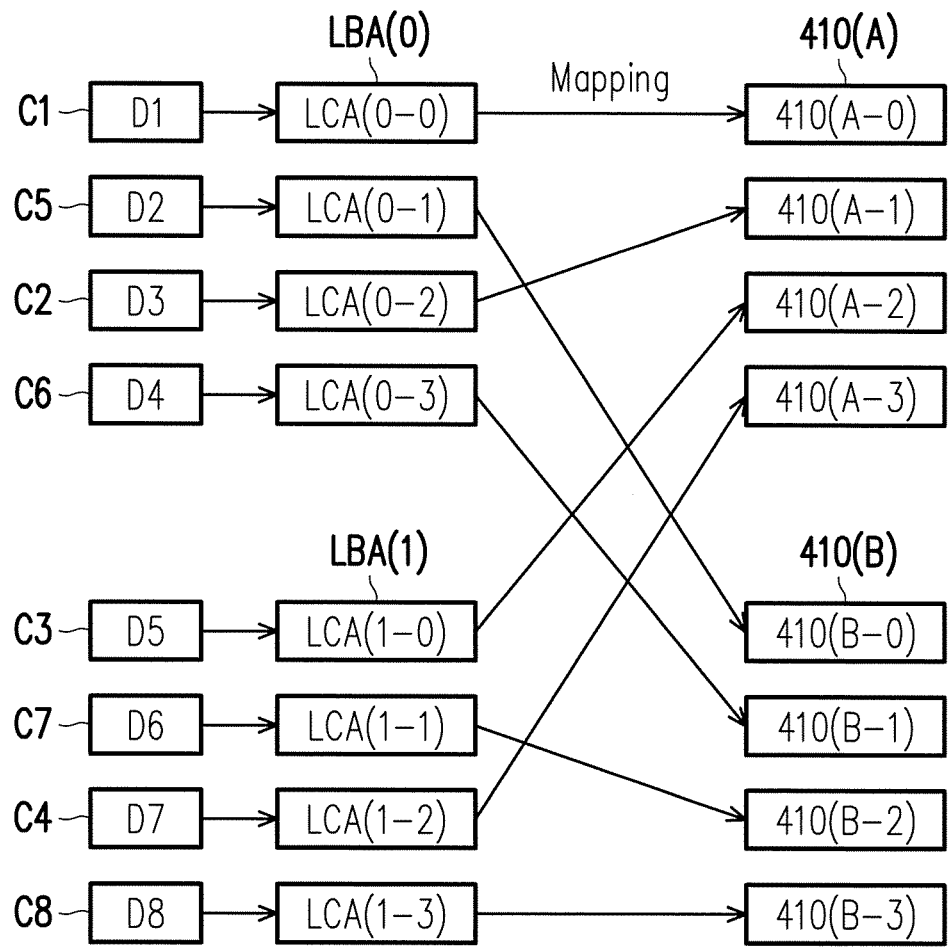
FIG. 8 illustrates a schematic diagram for writing data based on physical programming units according to an exemplary embodiment.

FIG. 8 illustrates a schematic diagram for writing data based on PPUs according to an exemplary embodiment.

Referring to FIG. 8, it is assumed that the host system 11 sends multiple write commands at different time points to instruct data to be stored into different LSUs. For example, a write command C1 instructs data D1 to be stored into a LSU LCA(0-0) of the LU LBA(0); a write command C2 instructs data D3 to be stored into a LSU LCA(0-2) of the LU LBA(0); a write command C3 instructs data D5 to be stored into a LSU LCA(1-0) of the LU LBA(1); a write command C4 instructs data D7 to be stored into a LSU LCA(1-2) of the LU LBA(1). In response to the write commands C1 to C4, the MMC 502 retrieves the PEU 410(A) from the spare area 604 to serve as the in-use PEU, and writes data D1, D3, D5 and D7 into PPUs 410(A-0) to 410(A-3) of the PEU 410(A) respectively. The MMC 502 also records the related mapping information into the L2P table. For example, the LSUs LCA(0-0) and LCA(0-2) of the LU LBA(0) are mapped to the PPUs 410(A-0) and 410(A-1) of the PEU 410(A) respectively, and the LSUs LCA(1-0) and LCA(1-2) of the LU LBA(l) are mapped to the PPUs 410(A-2) and 410(A-3) of the PEU 410(A) respectively.

Later, the MMC 502 again receives write commands C5 to C8 from the host system 11. Because the PEU 410(A) is fully written at the time, the MMC 502 gets a PEU 410(B) from the spare area 604 to serve as the in-use PEU. According to the write commands C5 to C8, the MMC 502 writes data D2, D4, D6 and D8 into PPUs 410(B-0) to 410(B-3) of the PEU 410(B) respectively. In addition, the MMC 502 also records the related mapping information. For example, the LSUs LCA(0-1) and LCA(0-3) of the LU LBA(0) are mapped to the PPUs 410(B-0) and 410(B-1) of the PEU 410(B) respectively, and the LSUs LCA(1-1) and LCA(1-3) of the LU LBA(1) are mapped to the PPUs 410(B-2) and 410(B-3) of the PEU 410(B) respectively. Accordingly, after a writing operation corresponding to the data D1 to D8 is completed, the data belonging to two sequential LSUs in the LU LBA(0) (or the LU LBA(1)) are stored in the different PEUs, and said two sequential LSUs are mapped to PPUs from different PEUs. For example, the LSU LCA(0-0) of the LU LBA(0) is mapped to the PPU 410(A-0) of the PEU 410(A), and the LSU LCA(0-1) of the LU LBA(0) is mapped to the PPU 410(B-0) of the PEU 410(B). Here, the two sequential LSUs means that a logical address range of one of these LSUs follows a logical address range of another one of the LSUs. In other words, a starting logical address of one of the LSUs follows an ending logical address of another one of the LSUs.

In the present exemplary embodiment, the MMC 502 also records use information corresponding to each LU. For example, the MMC 502 may store the use information into the system area 606. The use information may include a valid count, a read count and a write count of the LU. The valid count may be used to indicate the number of LSUs stored with valid data in one LU. The read count may be used to indicate the number of times a reading operation is executed on one LU. The write count may be used to indicate the number of times a writing operation is executed on one LU. Nonetheless, the use information may also include other information rather than limited only to the content disclosed above.

Taking FIG. 8 for example, when the write command C1 is received, the MMC 502 executes a writing operation corresponding to the LSU LCA(0-0) of the LU LBA(0). In addition, the MMC 502 adds one to the valid count corresponding to the LU LBA(0) and adds one to the write count thereof. On the other hand, when the data belonging to the LSU LCA(0-0) of the LU LBA(0) is deleted or marked as invalid data, the MMC 502 subtracts one from the valid count corresponding to the LU LBA(0). Further, when the MMC 502 receives the read command from the host system 11, the MMC 502 adds one to the read count of the LU being read as instructed by the read command. However, in another exemplary embodiment, the MMC 502 may also record read counts corresponding to all the LSUs in one LU, and then calculate a sum of the read counts corresponding to all the LSUs as the read count of that LU.

Figure 9:
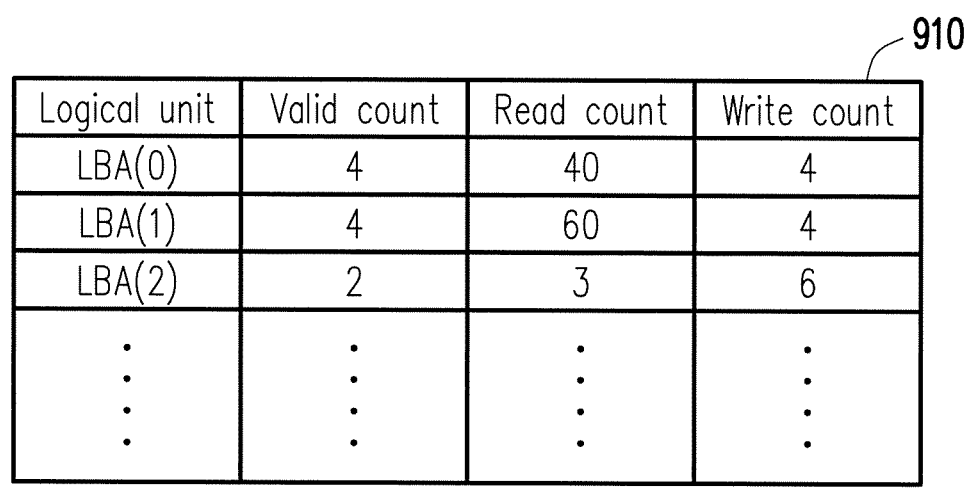
FIG. 9 is a schematic diagram illustrating use information of the logical unit according to an exemplary embodiment.

FIG. 9 is a schematic diagram illustrating use information of the LU according to an exemplary embodiment.

Referring to FIG. 9, the MMC 502 uses a recording table 910 to record the use information of each LU. As shown in the recording table 910, the valid count corresponding to the LU LBA(0) is 4, which means that the LU LBA(0) includes 4 LSUs stored with the valid data. Further, the read count and the write count corresponding to the LU LBA(0) are 40 and 4 respectively, which can be used to indicate that the data of LU LBA(0) has undergone the writing operation for 4 times and the reading operation for 40 times. In other words, the LU LBA(0) may be stored with frequently read data.

In particular, the MMC 502 can determine whether to execute a data move operation for one LU based on the use information corresponding to that LU. Here, the data move operation refers to move (or copy) data belonging to that LU to one PEU.

Specifically, the MMC 502 determines whether one LU matches a move condition based on the use information corresponding to that LU. In the present exemplary embodiment, the MMC 502 obtains the valid count and an access parameter of the LU based on the use information of the LU so as to determine whether the LU matches the move condition for executing the data move operation. For example, the MMC 502 can check the recording table 910 for obtaining the valid count corresponding to the LU LBA(0). In addition, the MMC 502 can also check the recording table 910 for obtaining the read count and the write count corresponding to the LU LBA(0), and calculate the access parameter corresponding to the LU LBA(0) based on the read count and the write count. In the present exemplary embodiment, the MMC 502 can obtain the access parameter by calculating a ratio of the read count to the write count. For example, based on the recording table 910, the LU LBA(0) has the valid count being 4 and the access parameter being 10; the LU LBA(1) has the valid count being 4 and the access parameter being 15; the LU LBA(2) has the valid count being 2 and the access parameter being 0.5.

Figure 10:
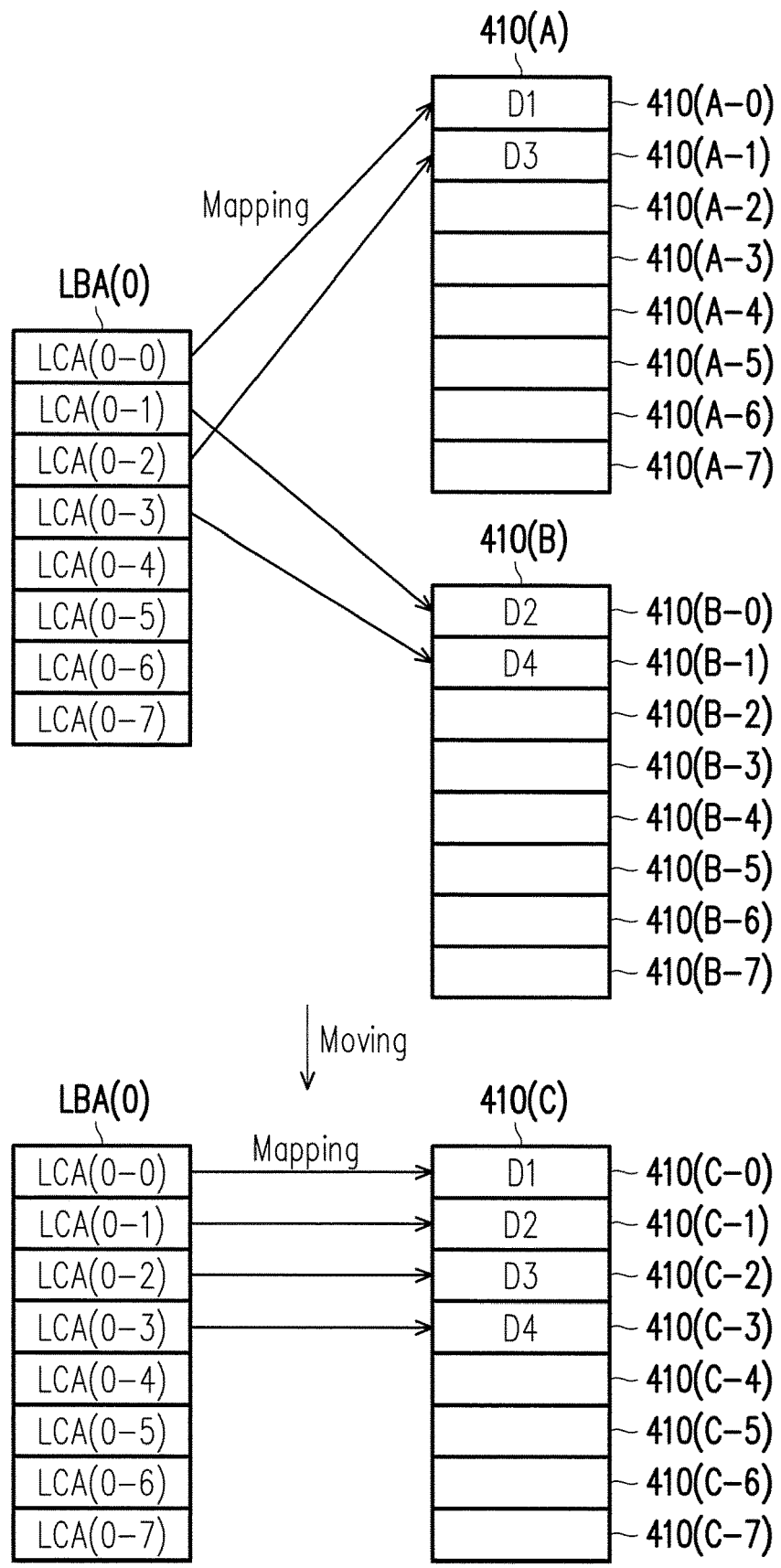
FIG. 10 is a schematic diagram illustrating a data move method for the logical units according to an exemplary embodiment.

FIG. 10 is a schematic diagram illustrating a data move method for the LUs according to an exemplary embodiment.

Referring to FIG. 10, it is assumed that one LU includes 8 LSUs, and one PEU includes 8 PPUs. For example, the LU LBA(0) includes LSUs LCA(0-0) to LCA(0-7). After the MMC 502 executes the write operation according to the write command as shown in FIG. 8, the LSUs LCA(0-0) to LCA(0-3) of the LU LBA(0) are mapped to the PPUs 410(A-0), 410(B-0), 410(A-1) and 410(B-1) respectively. The PPUs 410(A-0) and 410(A-1) belong to the PEU 410(A), and the PPUs 410(B-0) and 410(B-1) belong to the PEU 410(B). In the present exemplary embodiment, it is assumed that the LSUs LCA(0-4) to LCA(0-7) of the LU LBA(0) are not mapped to any PPU. In this case, the MMC 502 records the valid count of the LU LBA(0) as 4 in the recording table 910 of FIG. 9.

In the present exemplary embodiment, the MMC 502 sets a valid count threshold based on a total number of the LSUs in one LU. For example, the MMC 502 may set the valid count threshold as one half the total number of the LSUs in one LU. In other words, the valid count threshold may be set as 4. Further, the MMC 502 may also preset one access parameter threshold, and the access parameter threshold may be set as 2, for example. It is noted that, the valid count threshold and the access parameter threshold are not limited only to be the above values. In other exemplary embodiments, the valid count threshold and the access parameter threshold may also set to be suitable values based on different application requirements. For example, the valid count threshold may also be set as the total number of the LSUs in one LU, or the valid count threshold may also be set as one quarter the total number of the LSUs in one LU.

In the present exemplary embodiment, the MMC 502 may check all the LUs in order to find the LU which matches the move condition for executing the data move operation. The MMC 502 may determine whether the LU matches a first move condition based on the valid count of one LU. For example, after checking the LU LBA(0), the MMC 502 may obtain the valid count corresponding to the LU LBA(0) from the recording table 910 of FIG. 9. Next, the MMC 502 determines whether the valid count of the LU LBA(0) is less than the valid count threshold. For example, it is assumed that the valid count threshold is preset as 4 and the valid count of the LU LBA(0) is 4. In this case, the MMC 502 determines that the valid count of the LU LBA(0) is not less than the valid count threshold and thus determines that the LU LBA(0) matches the first move condition.

Further, the MMC 502 may also determine whether one LU matches a second move condition based on the access parameter of the LU. For example, the MMC 502 further obtains the read count and the write count corresponding to the LU LBA(0) from the recording table 910 of FIG. 9, and obtains the access parameter of the LU LBA(0) by calculating the ratio of the read count to the write count. Then, the MMC 502 may determine whether the access parameter of the LU LBA(0) is less than the access parameter threshold. For example, it is assumed that the access parameter threshold is preset as 2, and the access parameter of the LU LBA(0) calculated by the MMC 502 is 10. In this case, the MMC 502 determines that the access parameter of the LU LBA(0) is not less than the access parameter threshold and thus determines that the LU LBA(0) matches the second move condition.

When the LU LBA(0) matches the first move condition (i.e., the valid count of the LU LBA(0) is not less than the valid count threshold) and the LU LBA(0) matches the second move condition (i.e., the access parameter of the LU LBA(0) is not less than the access parameter threshold), the MMC 502 determines that the LU LBA(0) matches the move condition for executing the data move operation. Then, the MMC 502 gets one empty PEU 410(C) from the spare area 606, and copies the data belonging to the LU LBA(0) (i.e., the data D1, D2, D3 and D4 stored in the PPUs 410(A-0), 410(B-0), 410(A-1) and 410(B-1)) to the PEU 410(C). As shown in FIG. 10, the MMC 502 executes the data move operation to sequentially store the data D1 to D4 into PPUs 410(C-0) to 410(C-3) of the PEU 410(C). In an exemplary embodiment, the MMC 502 also updates the mapping information corresponding to the LU LBA(0) in the L2P table as the LSUs LCA(0-0) to LCA(0-3) of the LU LBA(0) being mapped to the PPUs 410(C-0) to 410(C-3) of the PEU 410(C). The PPUs 410(C-0) to 410(C-3) correspond to a sequential physical address range.

Figure 11:
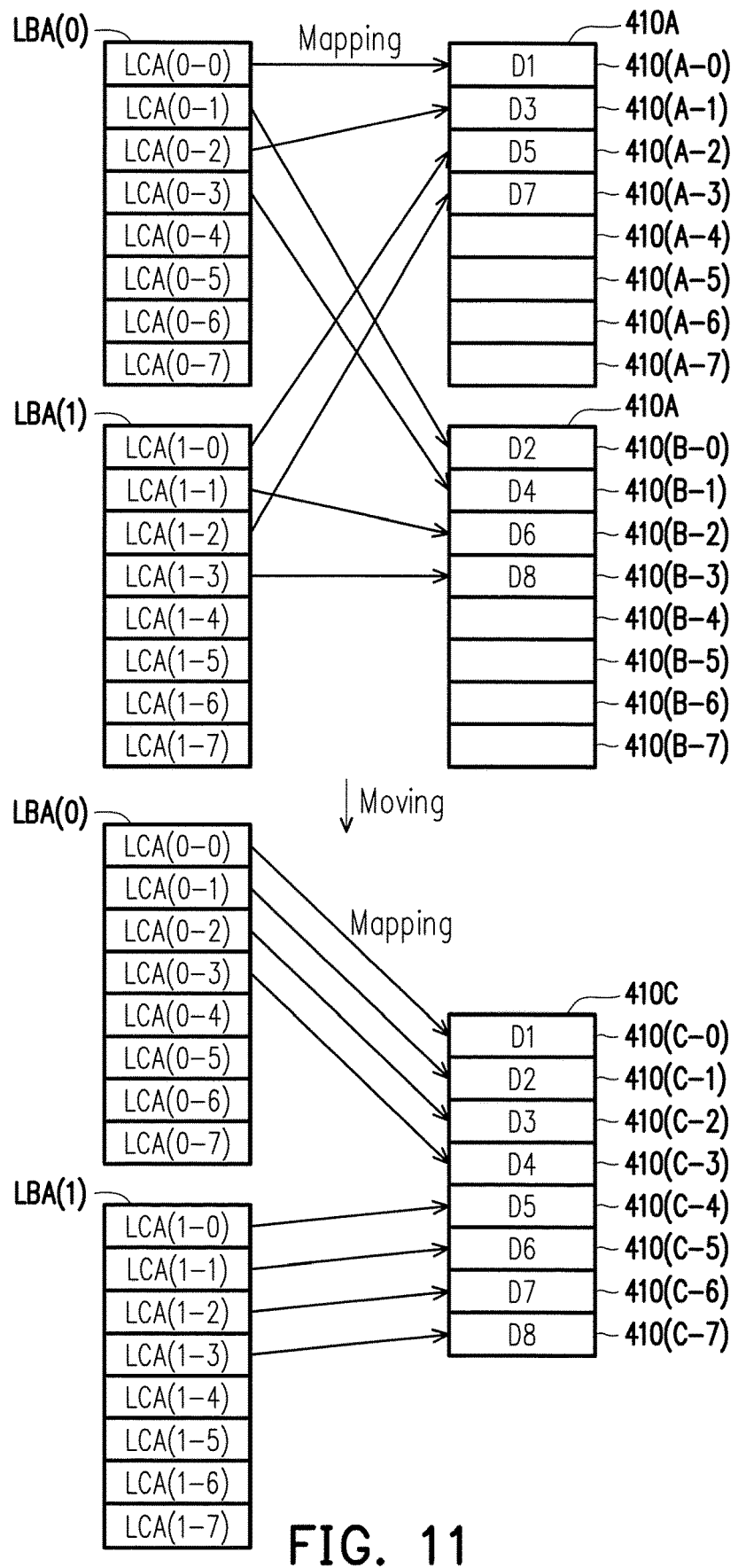
FIG. 11 is a schematic diagram illustrating a data move method for the logical units according to another exemplary embodiment.

FIG. 11 is a schematic diagram illustrating a data move method for the LUs according to another exemplary embodiment.

Referring to FIG. 11, as similar to the exemplary embodiment of FIG. 10, the MMC 502 copies the data belonging to the LU LBA(0) to the PPU 410(C-0) to 410(C-3) of the PEU 410(C). Also, the valid count threshold is 4 and the access parameter threshold is 2. However, in the exemplary embodiment of FIG. 11, it is assumed that LSUs LCA(1-4) to LCA(1-7) of the LU LBA(1) are not mapped to any PPU. Accordingly, the MMC 502 may obtain the valid count of the LU LBA(1) being 4 based on the use information corresponding to the LU LBA(1) in the recording table 910 of FIG. 9. Next, the MMC 502 determines that the valid count of the LU LBA(1) is not less than the valid count threshold. In addition, the MMC 502 also obtains the read count and the write count corresponding to the LU LBA(1) from the recording table 910 of FIG. 9, and calculates that the access parameter of the LU LBA(1) is 15. Next, the MMC 502 determines that the access parameter of the LU LBA(1) is not less than the access parameter threshold. Because the valid count of the LU LBA(1) is not less than the valid count threshold and the access parameter of the LU LBA(1) is not less than the access parameter threshold, the MMC 502 determines that the LU LBA(1) matches the move condition for executing the data move operation.

In the present exemplary embodiment, the MMC 502 copies the data belonging to the LU LBA(1) (i.e., the data D5, D6, D7 and D8 stored in the PPUs 410(A-2), 410(B-2), 410(A-3) and 410(B-3)) to the PEU 410(C). As shown in FIG. 11, the MMC 502 sequentially stores the data D5 to D8 into PPUs 410(C-4) to 410(C-7) of the PEU 410(C), and updates the mapping information corresponding to the LU LBA(1) in the L2P table as the LSUs LCA(1-0) to LCA(1-3) of the LU LBA(1) being mapped to the PPUs 410(C-4) to 410(C-7) of the PEU 410(C).

It is noted that, in the exemplary embodiments of FIG. 10 and FIG. 11, the MMC 502 can first determine whether the valid count is not less than the valid count threshold for the LUs and record the LUs with the valid count not less than the valid count threshold. For example, the MMC 502 can record the starting logical addresses representing the LUs with the valid count not less than the valid count threshold into one PEU of the system area 606. Subsequently, when the data move operation is to be executed, the MMC 502 can then determine whether the access parameter is less than the access parameter threshold for the recorded LUs, and thus determine the LUs with the access parameter not less than the access parameter threshold, so as to determine the LUs to which the data move operation can be executed.

After determining the LUs to which the data move operation can be executed, the MMC 502 executes the data move operation corresponding to the determined LUs. In an exemplary embodiment, the MMC 502 can execute the data move operation right after the LUs to which the data move operation can be executed is determined. However, in another exemplary embodiment, the MMC 502 may also record the determined LUs, and execute the data move operation corresponding to the determined LUs at a specific time. For example, when a garbage collection operation is executed in a background execution mode, the MMC 502 can synchronously execute the data move operation corresponding to the determined LUs. Alternatively, the MMC 502 may also instruct the data move operation corresponding to the determined LU to be synchronously executed when sending a write command sequence. An execution time for executing the data move operation is not particularly limited by the invention.

Figure 12:
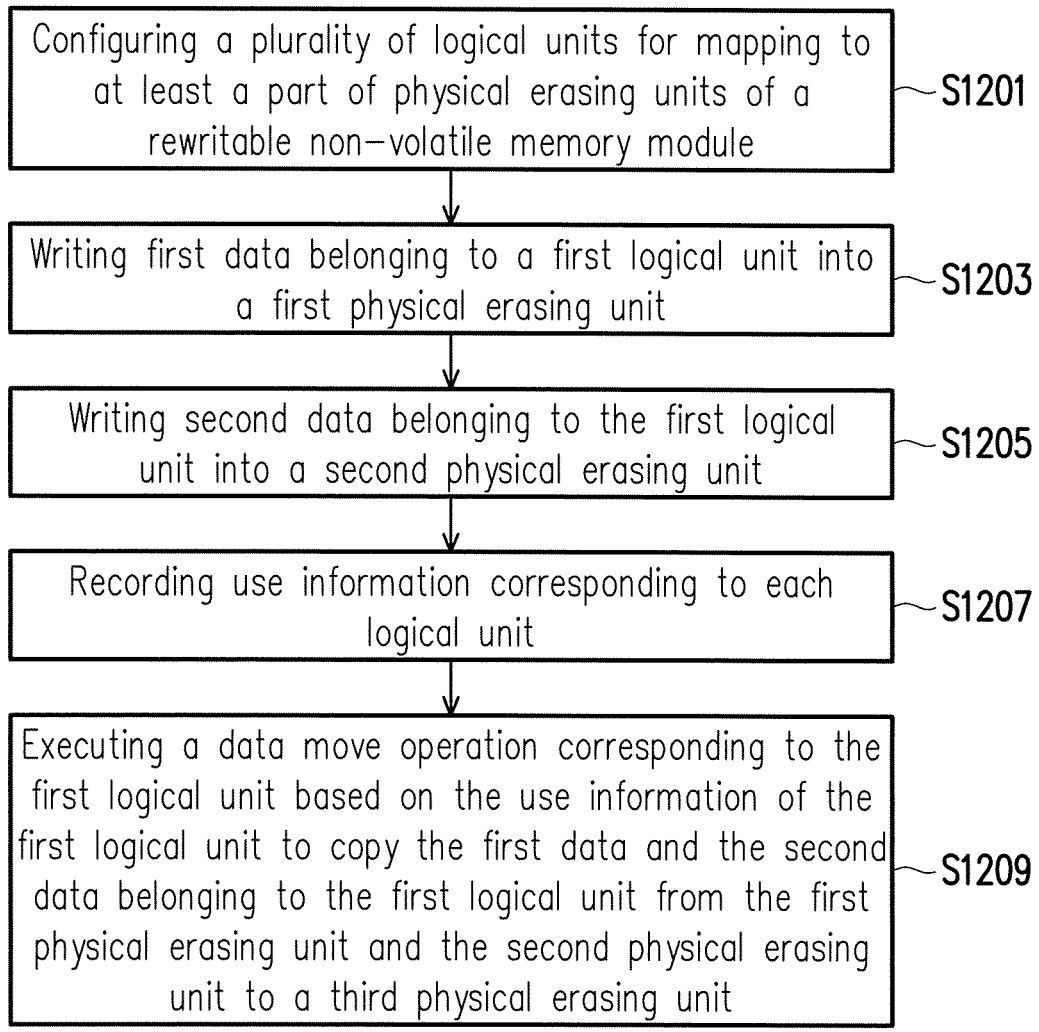
FIG. 12 is a flowchart of a data writing method according to an exemplary embodiment.

FIG. 12 is a flowchart of a data writing method according to an exemplary embodiment.

Referring to FIG. 12, in step S1201, the MMC 502 configures a plurality of LUs for mapping to at least a part of PEUs of the RNVM module 406. The MMC 502 may record the mapping information corresponding to the LU into a L2P table. The mapping information may include information indicating how the LUs are mapped to the PEUs, or information indicating how the LSUs are mapped to the PPUs.

In step S1203, the MMC 502 writes first data belonging to a first LU into a first PEU based on a write command from the host system 11. In step S1205, the MMC 502 writes second data belonging to the first LU into a second PEU based on a write command from the host system 11. In the present exemplary embodiment, the first data belongs to a first LSU of the first LU, the second data belongs to a second LSU of the first LU, and a logical address range of the second LSU follows a logical address range of the first LSU.

Next, in step S1207, the MMC 502 records use information corresponding to each LU.

In step S1209, the MMC 502 executes a data move operation corresponding to the first LU based on the use information of the first LU to copy the first data and the second data belonging to the first LU from the first PEU and the second PEU to a third PEU.

Figure 13:
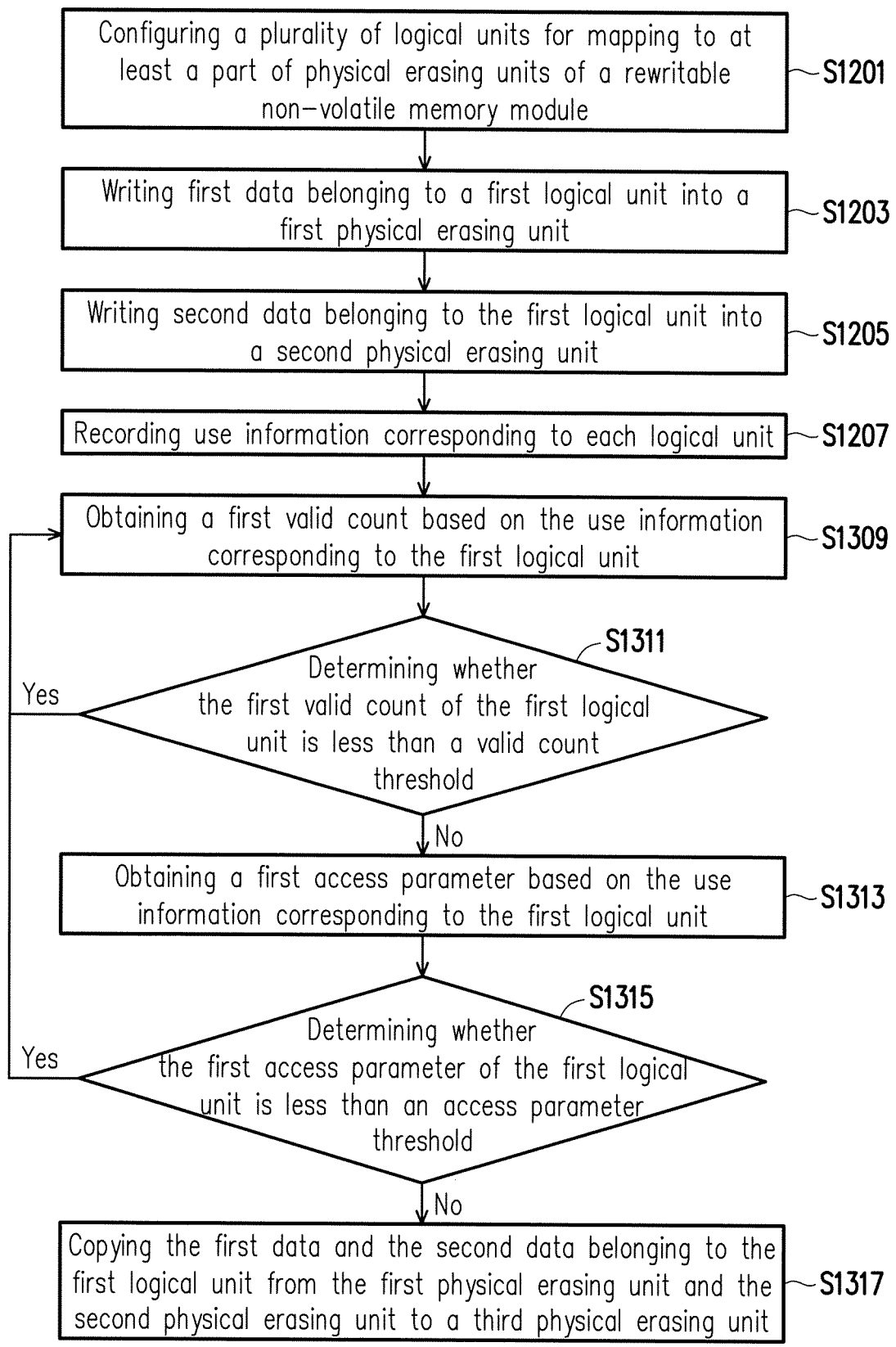
FIG. 13 is a flowchart of a data writing method according to another exemplary embodiment.

FIG. 13 is a flowchart of a data writing method according to another exemplary embodiment. Steps with identical numbers in FIG. 13 and FIG. 12 refer to the same operation. Steps S1309 to S1317 in FIG. 13 are detailed steps of the step S1209 in FIG. 12. Steps S1309 to S1317 will be described below. In the present exemplary embodiment, the use information of each LU includes a valid count, a read count and a write count of each LU.

In step S1309, the MMC 502 obtains a first valid count based on the use information corresponding to the first LU. For example, the MMC 502 may obtain the corresponding valid count by checking a recording table used for recording the use information.

Next, in step S1311, the MMC 502 determines whether the first valid count of the first LU is less than a valid count threshold.

If the first valid count is less than the valid count threshold, the MMC 502 selects another LU to serve as the first LU and executes step S1309 again. On the other hand, if the first valid count is not less than the valid count threshold, the MMC 502 obtains a first access parameter based on the use information corresponding to the first LU in step S1313. In the present exemplary embodiment, the MMC 502 obtains the first access parameter by calculating a ratio of the read count to the write count of the first LU.

Next, in step S1315, the MMC 502 determines whether the first access parameter of the first LU is less than an access parameter threshold.

If the first access parameter of the first LU is less than the access parameter threshold, the MMC 502 selects another LU to serve as the first LU, and executes step S1309 again. On the other hand, if the first access parameter of the first LU is not less than the access parameter threshold, the MMC 502 copies the first data and the second data belonging to the first LU from the first PEU and the second PEU to a third PEU in step S1317.

However, in another exemplary embodiment, after step S1311 is executed, if the first valid count of one first LU is not less than the valid count threshold, the MMC 502 can first record that first LU. Next, the MMC 502 selects another LU to serve as the new first LU and execute step S1309 again. In this way, the LUs with the valid count not less than the valid count threshold among all the LUs can be found. Later, the MMC 502 can execute the operation of step S1313 on the recorded LUs (i.e., the LUs with valid count not less than the valid count threshold among all the LUs). In other words, the MMC 502 selects the new LU from the recorded LUs for the operation of step S1313. In this exemplary embodiment, after step S1313 is executed, if the first access parameter of the first LU (i.e., one of the recorded LUs) is less than the access parameter threshold, the MMC 502 selects another LU from the recorded LUs to serve as the new LU and executes step S1313 again.

Details regarding each step in FIG. 12 and FIG. 13 have been described in the foregoing embodiments, and thus related description is not repeated hereinafter.

In summary, the present invention can be used to obtain the valid count and the access parameter of the LU by recording the use information corresponding to the LU. When the valid count of the LU reaches the valid count threshold and the access parameter reaches the access parameter threshold, the data belonging to such LU will be arranged into one PEU. In other words, the LUs stored with more valid data and stored with the frequently read data can be selected for the data move operation. Accordingly, the data of those LUs will be stored in one PEU. As a result, not only can the time for finding the corresponding mapping information from the L2P table be saved, the data belonging to the sequential logical addresses can also be read with use of fewer read commands, so as to reduce the execution time for the read operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a rewritable non-volatile memory module having a plurality of physical erasing units, the data writing method comprising:

configuring a plurality of logical units for mapping to at least a part of physical erasing units among the physical erasing units, wherein the logical units comprise a first logical unit;

writing first data belonging to the first logical unit into a first physical erasing unit among the physical erasing units;

writing second data belonging to the first logical unit into a second physical erasing unit among the physical erasing units;

recording use information corresponding to each logical unit among the logical units, wherein the use information comprises a read count, a write count and a first access parameter; and executing a data move operation corresponding to the first logical unit by determining whether the first logical unit matches a move condition based on the use information of the first logical unit to copy the first data and the second data belonging to the first logical unit from the first physical erasing unit and the second physical erasing unit to a third physical erasing unit among the physical erasing units, wherein the step of determining whether the first logical unit matches the move condition based on the use information of the first logical unit further comprises: obtaining the first access parameter according to a ratio of the read count to the write count of the first logical unit, and determining that the first logical unit matches a second move condition when the first access parameter is not less than an access parameter threshold, wherein the first data belongs to a first logical sub-unit of the first logical unit, the second data belongs to a second logical sub-unit of the first logical unit, and a logical address range of the second logical sub-unit follows a logical address range of the first logical sub-unit.

2. The data writing method according to claim 1, wherein the step of executing the data move operation corresponding to the first logical unit by determining whether the first logical unit matches the move condition based on the use information of the first logical unit comprises:

executing the data move operation corresponding to the first logical unit when determining that the first logical unit matches the move condition.

3. The data writing method according to claim 1, wherein the use information corresponding to each logical unit comprises a valid count, wherein the step of determining whether the first logical unit matches the move condition based on the use information of the first logical unit comprises:

determining that the first logical unit matches a first move condition when a first valid count corresponding to the first logical unit is not less than a valid count threshold.

4. The data writing method according to claim 3, further comprising:

determining the valid count threshold according to a number of all the logical sub-units in one logical unit.

5. The data writing method according to claim 3, wherein the step of determining whether the first logical unit matches the move condition based on the use information of the first logical unit further comprises:

determining that the first logical unit matches the move condition if the first logical unit matches the first move condition and the first logical unit matches the second move condition.

6. The data writing method according to claim 3, wherein the step of obtaining the first access parameter according to the ratio of the read count to the write count of the first logical unit is executed if the first valid count of the first logical unit is not less than the valid count threshold.

7. The data writing method according to claim 1, further comprising:

after the step of executing the data move operation corresponding to the first logical unit by determining whether the first logical unit matches the move condition based on the use information of the first logical unit to copy the first data and the second data belonging to the first logical unit from the first physical erasing unit and the second physical erasing unit to the third physical erasing unit among the physical erasing units, setting the first logical unit to be mapped to the third physical erasing unit.

8. The data writing method according to claim 1, wherein the step of executing the data move operation corresponding to the first logical unit by determining whether the first logical unit matches the move condition based on the use information of the first logical unit to copy the first data and the second data belonging to the first logical unit from the first physical erasing unit and the second physical erasing unit to the third physical erasing unit among the physical erasing units comprises:

copying the first data belonging to the first logical sub-unit from the first physical erasing unit to a first physical programming unit of the third physical erasing unit; and copying the second data belonging to the second logical sub-unit from the second physical erasing unit to a second physical programming unit of the third physical erasing unit, wherein a physical address range of the second physical programming unit follows a physical address range of the first physical programming unit.

9. The data writing method according to claim 1, wherein the logical units comprise a second logical unit, and the data writing method further comprises:

writing third data belonging to the second logical unit into a fourth physical erasing unit among the physical erasing units;

writing fourth data belonging to the second logical unit into a fifth physical erasing unit among the physical erasing units; and executing a data move operation corresponding to the second logical unit based on the use information of the second logical unit to copy the third data and the fourth data belonging to the second logical unit from the fourth physical erasing unit and the fifth physical erasing unit to the third physical erasing unit.

10. A memory storage device, comprising:

a connection interface unit, configured to couple to a host system;

a rewritable non-volatile memory module, having a plurality of physical erasing units; and a memory control circuit unit, configured to couple to the connection interface unit and the rewritable non-volatile memory module, wherein the memory control circuit unit is configured to configure a plurality of logical units for mapping to at least a part of physical erasing units among the physical erasing units, wherein the logical units comprise a first logical unit, wherein the memory control circuit unit is further configured to write first data belonging to the first logical unit into a first physical erasing unit among the physical erasing units, wherein the memory control circuit unit is further configured to write second data belonging to the first logical unit into a second physical erasing unit among the physical erasing units, wherein the memory control circuit unit is further configured to record use information corresponding to each logical unit among the logical units, wherein the use information comprises a read count, a write count and a first access parameter, wherein the memory control circuit unit is further configured to execute a data move operation corresponding to the first logical unit by determining whether the first logical unit matches a move condition based on the use information of the first logical unit to copy the first data and the second data belonging to the first logical unit from the first physical erasing unit and the second physical erasing unit to a third physical erasing unit among the physical erasing units, wherein in the operation of determining whether the first logical unit matches the move condition based on the use information of the first logical unit, the memory control circuit unit is further configured to obtain the first access parameter according to a ratio of the read count to the write count of the first logical unit, and the memory control circuit unit determines that the first logical unit matches a second move condition when the first access parameter is not less than an access parameter threshold, wherein the first data belongs to a first logical sub-unit of the first logical unit, the second data belongs to a second logical sub-unit of the first logical unit, and a logical address range of the second logical sub-unit follows a logical address range of the first logical sub-unit.

11. The memory storage device according to claim 10, wherein in the operation of executing the data move operation corresponding to the first logical unit by determining whether the first logical unit matches the move condition based on the use information of the first logical unit, the memory control circuit unit is configured to execute the data move operation corresponding to the first logical unit when determining that the first logical unit matches the move condition.

12. The memory storage device according to claim 10, wherein the use information corresponding to each logical unit comprises a valid count, wherein in the operation of determining whether the first logical unit matches the move condition based on the use information of the first logical unit, the memory control circuit unit determines that the first logical unit matches a first move condition when a first valid count corresponding to the first logical unit is not less than a valid count threshold.

13. The memory storage device according to claim 12, wherein the memory control circuit unit is further configured to determine the valid count threshold according to a number of all the logical sub-units in one logical unit.

14. The memory storage device according to claim 12, wherein in the operation of determining whether the first logical unit matches the move condition based on the use information of the first logical unit, the memory control circuit unit determines that the first logical unit matches the move condition if the first logical unit matches the first move condition and the first logical unit matches the second move condition.

15. The memory storage device according to claim 12, wherein the memory control circuit unit executes the operation of obtaining the first access parameter according to the ratio of the read count to the write count of the first logical unit if the first valid count of the first logical unit is not less than the valid count threshold.

16. The memory storage device according to claim 10, wherein after the operation of copying the first data and the second data belonging to the first logical unit from the first physical erasing unit and the second physical erasing unit to the third physical erasing unit among the physical erasing units, the memory control circuit unit is further configured to set the first logical unit to be mapped to the third physical erasing unit.

17. The memory storage device according to claim 10, wherein in the operation of executing the data move operation corresponding to the first logical unit by determining whether the first logical unit matches the move condition based on the use information of the first logical unit to copy the first data and the second data belonging to the first logical unit from the first physical erasing unit and the second physical erasing unit to the third physical erasing unit among the physical erasing units, the memory control circuit unit is configured to copy the first data belonging to the first logical sub-unit from the first physical erasing unit to a first physical programming unit of the third physical erasing unit, and copy the second data belonging to the second logical sub-unit from the second physical erasing unit to a second physical programming unit of the third physical erasing unit, wherein a physical address range of the second physical programming unit follows a physical address range of the first physical programming unit.

18. The memory storage device according to claim 10, wherein the logical units comprise a second logical unit, wherein the memory control circuit unit is further configured to write third data belonging to the second logical unit into a fourth physical erasing unit among the physical erasing units, wherein the memory control circuit unit is further configured to write fourth data belonging to the second logical unit into a fifth physical erasing unit among the physical erasing units, wherein the memory control circuit unit is further configured to execute a data move operation corresponding to the second logical unit based on the use information of the second logical unit to copy the third data and the fourth data belonging to the second logical unit from the fourth physical erasing unit and the fifth physical erasing unit to the third physical erasing unit.

19. A memory control circuit unit for controlling a rewritable non-volatile memory module having a plurality of physical erasing units, the memory control circuit unit comprising:

a host interface configured to couple to a host system;

a memory interface, configured to couple to the rewritable non-volatile memory module; and a memory management circuit, configured to couple to the host interface and the memory interface, wherein the memory management circuit is configured to configure a plurality of logical units for mapping to at least a part of physical erasing units among the physical erasing units, wherein the logical units comprise a first logical unit, wherein the memory management circuit is further configured to write first data belonging to the first logical unit into a first physical erasing unit among the physical erasing units, wherein the memory management circuit is further configured to write second data belonging to the first logical unit into a second physical erasing unit among the physical erasing units, wherein the memory management circuit is further configured to record use information corresponding to each logical unit among the logical units, wherein the use information comprises a read count, a write count and a first access parameter, wherein the memory management circuit is further configured to execute a data move operation corresponding to the first logical unit by determining whether the first logical unit matches a move condition based on the use information of the first logical unit to copy the first data and the second data belonging to the first logical unit from the first physical erasing unit and the second physical erasing unit to a third physical erasing unit among the physical erasing units, wherein in the operation of determining whether the first logical unit matches the move condition based on the use information of the first logical unit, the memory management circuit is further configured to obtain the first access parameter according to a ratio of the read count to the write count of the first logical unit, and the memory management circuit determines that the first logical unit matches a second move condition when the first access parameter is not less than an access parameter threshold, wherein the first data belongs to a first logical sub-unit of the first logical unit, the second data belongs to a second logical sub-unit of the first logical unit, and a logical address range of the second logical sub-unit follows a logical address range of the first logical sub-unit.

20. The memory control circuit unit according to claim 19, wherein in the operation of executing the data move operation corresponding to the first logical unit by determining whether the first logical unit matches the move condition based on the use information of the first logical unit, the memory management circuit is configured to execute the data move operation corresponding to the first logical unit when determining that the first logical unit matches the move condition.

21. The memory control circuit unit according to claim 19, wherein the use information corresponding to each logical unit comprises a valid count, wherein in the operation of determining whether the first logical unit atches the move condition based on the use information of the first logical unit, the memory management circuit determines that the first logical unit matches a first move condition when a first valid count corresponding to the first logical unit is not less than a valid count threshold.

22. The memory control circuit unit according to claim 21, wherein the memory management circuit is further configured to determine the valid count threshold according to a number of all the logical sub-units in one logical unit.

23. The memory control circuit unit according to claim 21, wherein in the operation of determining whether the first logical unit matches the move condition based on the use information of the first logical unit, the memory management circuit determines that the first logical unit matches the move condition if the first logical unit matches the first move condition and the first logical unit matches the second move condition.

24. The memory control circuit unit according to claim 21, wherein the memory management circuit executes the operation of obtaining the first access parameter according to the ratio of the read count to the write count of the first logical unit if the first valid count of the first logical unit is not less than the valid count threshold.

25. The memory control circuit unit according to claim 19, wherein after the operation of copying the first data and the second data belonging to the first logical unit from the first physical erasing unit and the second physical erasing unit to the third physical erasing unit among the physical erasing units, the memory management circuit is further configured to set the first logical unit to be mapped to the third physical erasing unit.

26. The memory control circuit unit according to claim 19, wherein in the operation of executing the data move operation corresponding to the first logical unit by determining whether the first logical unit matches the move condition based on the use information of the first logical unit to copy the first data and the second data belonging to the first logical unit from the first physical erasing unit and the second physical erasing unit to the third physical erasing unit among the physical erasing units, the memory management circuit is configured to copy the first data belonging to the first logical sub-unit from the first physical erasing unit to a first physical programming unit of the third physical erasing unit, and copy the second data belonging to the second logical sub-unit from the second physical erasing unit to a second physical programming unit of the third physical erasing unit, wherein a physical address range of the second physical programming unit follows a physical address range of the first physical programming unit.

27. The memory control circuit unit according to claim 19, wherein the logical units comprise a second logical unit, wherein the memory management circuit is further configured to write third data belonging to the second logical unit into a fourth physical erasing unit among the physical erasing units, wherein the memory management circuit is further configured to write fourth data belonging to the second logical unit into a fifth physical erasing unit among the physical erasing units, wherein the memory management circuit is further configured to execute a data move operation corresponding to the second logical unit based on the use information of the second logical unit to copy the third data and the fourth data belonging to the second logical unit from the fourth physical erasing unit and the fifth physical erasing unit to the third physical erasing unit.

* * * * *